United States Patent
Häberle et al.

(10) Patent No.: US 11,319,451 B2
(45) Date of Patent: May 3, 2022

(54) LOW-EMISSION LIQUID FILM FOR SEALING BUILDINGS

(71) Applicant: SIKA TECHNOLOGY AG, Baar (CH)

(72) Inventors: Hans Häberle, Gailingen (DE); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/940,513

(22) Filed: Jul. 28, 2020

(65) Prior Publication Data

US 2020/0354584 A1 Nov. 12, 2020

Related U.S. Application Data

(63) Continuation of application No. 16/076,096, filed as application No. PCT/EP2017/053319 on Feb. 14, 2017, now Pat. No. 10,759,946.

(30) Foreign Application Priority Data

Feb. 15, 2016 (EP) .................................... 16155770

(51) Int. Cl.
| | |
|---|---|
| *C09D 163/00* | (2006.01) |
| *C09D 5/00* | (2006.01) |
| *C09D 171/02* | (2006.01) |
| *C08G 59/50* | (2006.01) |
| *C08G 65/336* | (2006.01) |
| *C09D 175/12* | (2006.01) |
| *C09D 183/12* | (2006.01) |
| *C08K 5/17* | (2006.01) |

(52) U.S. Cl.
CPC ......... *C09D 5/002* (2013.01); *C08G 59/5006* (2013.01); *C08G 65/336* (2013.01); *C09D 163/00* (2013.01); *C09D 171/02* (2013.01); *C09D 175/12* (2013.01); *C09D 183/12* (2013.01); *C08K 5/17* (2013.01)

(58) Field of Classification Search
CPC .................................. C08L 43/04; C08L 63/00
See application file for complete search history.

(56) References Cited

U.S. PATENT DOCUMENTS

| | | |
|---|---|---|
| 6,505,455 B1 | 1/2003 | Georgeau |
| 2011/0027591 A1 | 2/2011 | Braun et al. |
| 2013/0096274 A1 | 4/2013 | Vyakaranam et al. |
| 2014/0179830 A1 | 6/2014 | Burckhardt et al. |
| 2014/0288247 A1 | 9/2014 | Burckhardt et al. |
| 2015/0086774 A1 | 3/2015 | Ackermann et al. |
| 2015/0166852 A1 | 6/2015 | Ackermann et al. |
| 2017/0058510 A1 | 3/2017 | Seabaugh et al. |
| 2017/0292050 A1 | 10/2017 | Burckhardt et al. |

FOREIGN PATENT DOCUMENTS

| | | |
|---|---|---|
| CN | 103687914 A | 3/2014 |
| EP | 0 186 191 A2 | 7/1986 |
| EP | 0370464 A2 | 5/1990 |
| EP | 1695989 A1 | 8/2006 |
| EP | 1840166 A1 | 10/2007 |
| EP | 1987108 B1 | 9/2009 |
| EP | 2562223 A1 | 2/2013 |
| EP | 2662214 A1 | 11/2013 |
| EP | 2748263 B1 | 7/2015 |
| JP | 2003-34757 A | 2/2003 |
| WO | 2008/027496 A2 | 3/2008 |
| WO | 2011/151389 A1 | 12/2011 |
| WO | 2014/131757 A1 | 9/2014 |
| WO | 2015/117846 A1 | 8/2015 |

OTHER PUBLICATIONS

Apr. 13, 2017 International Search Report issued in Patent Application No. PCT/EP2017/053319.
Aug. 21, 2018 International Preliminary Report on Patentability issued in International Patent Application No. PCT/EP2017/053319.

*Primary Examiner* — Mark S Kaucher
(74) *Attorney, Agent, or Firm* — Oliff PLC

(57) ABSTRACT

A composition, including at least one silane group-containing polymer that is liquid at room temperature, at least one epoxide liquid resin, and at least one aliphatic polyamine having a molecular weight of at least 115 g/mol and having at least three amine hydrogens reactive toward epoxide groups. The composition is a liquid that is configured to form a sealing membrane after curing. The sealing film applied in liquid form is isocyanate-free, low-odor, and easy to process because of the low viscosity and the long open time. The sealing film cures quickly and forms a high-quality elastic material having good mechanical properties and good weather resistance.

20 Claims, No Drawings

LOW-EMISSION LIQUID FILM FOR SEALING BUILDINGS

CROSS-REFERENCE TO RELATED APPLICATIONS

This is a Continuation of U.S. application Ser. No. 16/076,096 filed Aug. 7, 2018, which is allowed and in turn is a U.S. National Stage Entry of Application No. PCT/EP2017/053319 filed Feb. 14, 2017, which claims the benefit of European Application No. 16155770.7 filed Feb. 15, 2016. The disclosure of each of the prior applications is hereby incorporated by reference herein in its entirety.

TECHNICAL FIELD

The invention relates to reactive polymer compositions which can be applied in liquid form and to application thereof as liquid applied membranes for sealing constructions against water penetration.

PRIOR ART

Liquid-appliable reactive polymer compositions which are employed as crack-bridging coatings to seal constructions against water penetration have been prior art for some considerable time. They are also referred to as liquid applied membranes or "LAMs". Relative to prefabricated sealing membranes, they afford greater ease of application, particularly on geometrically complex surfaces, improved protection from lateral migration, owing to the full-area adhesion to the substrate, and seamless laying. Relative to nonreactive liquid applied systems such as polymer solutions, aqueous polymer dispersions or products based on bitumen, they are distinguished by high strength and high elasticity, even under cold conditions, and do not readily attract dirt, and also provide long-term sealing even under standing water. To provide constructions with reliable protection from water penetration, the crack-bridging properties of a cured, liquid applied membrane over a wide temperature range are important. Accordingly, the cured material must possess high stretchability, high strength with not too high a modulus of elasticity, and good tear resistance.

The known reactive liquid applied polymer membranes are typically isocyanate-containing polyurethanes, and are on the market as one-component, moisture-curing systems or as two-component systems. They do have good mechanical properties and resistance qualities, but they also have technical disadvantages. At the curing stage, for instance, they are sensitive to moisture and temperature. At high atmospheric humidity, especially in combination with high temperature, with a moist substrate or under direct water attack, there may be bubbles formed as a result of evolution of $CO_2$, causing the coating to foam up and impairing its sealing function and resistance qualities. Under warm conditions, they display a short open time, and under cold conditions they cure very slowly or remain soft and tacky over the long term. Furthermore, they are at pressure from regulation, owing to the EHS-critical isocyanate monomers and the often high level of solvents, which cause unpleasant odors and VOC emissions, and for this reason there is an intensive search on for alternatives.

As an isocyanate-free alternative to the liquid applied polyurethane membranes, those based on silane-functional polymers have been described, in EP 1 987 108, for example. These products, however, have an undesirably high viscosity or contain a very high level of low molecular mass silanes in order to lower the viscosity, thereby causing severe emissions of low molecular mass alcohols and significant contraction on curing. Moreover, they cure slowly and develop strength only in a very limited way, meaning that they are not serviceable unless reinforced with a nonwoven web or a glass-fiber scrim. Also known are two-component polymer compositions based on a combination of silane-functional polymers with epoxy resins—from EP 0 186 191 and EP 0 370 464, for example. Such systems achieve greater strength and toughness than those based on silane-functional polymers alone. The known systems, however, are not fit for use as liquid-appliable, reactive polymer compositions for construction sealing. For manual application they have viscosities that are too high, and unsuitable mechanical properties.

SUMMARY OF THE INVENTION

It is an object of the present invention to provide a liquid-appliable, reactive polymer composition, free from isocyanate groups, for construction sealing, which is low in odor, low in toxicity, low in emissions, long in shelf life, and easy to work by means of manual application, which cures rapidly and without destruction at ambient temperature, while developing a high strength and toughness in combination with high stretchability, and which is resistant to weathering over a long period of time.

It has been found that, surprisingly, this object is achieved by a composition as claimed in claim 1. It possesses a low odor and a low toxicity and is of surprisingly low viscosity, allowing it to be formulated entirely or largely without solvent. At room temperature it possesses a long open time, cures rapidly, and forms a high-grade, macroscopically homogeneous, nontacky, pale-colored material having good mechanical properties, especially high strength and stretchability with a low modulus of elasticity, and with high resistance to water, heat, and UV radiation. On account of these properties, the liquid composition can be easily applied and worked as a sealing membrane, cures rapidly even in a moist or cool environment, and forms a high-quality polymeric membrane of high strength and attractive surface with long weathering stability qualities. A particular surprise here is that the comparatively high viscosity of the resin matrix is lowered very greatly with a polyamine, especially in the preferred embodiments, hence allowing very good working to be achieved even without the use of solvents.

Further aspects of the invention are the subject of further independent claims. Particularly preferred embodiments of the invention are the subject of the dependent claims.

Ways of Executing the Invention

The invention provides for the use of a composition comprising
- at least one polymer which is liquid at room temperature and contains silane groups,
- at least one liquid epoxy resin, and
- at least one aliphatic polyamine having a molecular weight of at least 115 g/mol and containing at least three amine hydrogens that are reactive toward epoxide groups, as liquid applied sealing membrane.

In the present document, the term "aloxysilane group" or "silane group" for short refers to a silyl group which is bonded to an organic radical and has one to three, especially two or three, hydrolyzable alkoxy radicals on the silicon atom.

Correspondingly, the term "organosilane" or "silane" for short refers to an organic compound which contains at least one silane group.

"Aminosilane", "mercaptosilane", "hydroxysilane" and "isocyanatosilane" refer respectively to organosilanes having one or more amino, mercapto, hydroxyl or isocyanate groups on the organic radical in addition to the silane group.

The term "polyether containing silane groups" also encompasses polymers which contain silane groups and which, in addition to polyether units, may also contain urethane groups, urea groups or thiourethane groups. Such polyethers containing silane groups may also be referred to as "polyurethanes containing silane groups".

Substance names beginning with "poly", such as polyamine or polyisocyanate, refer to substances containing, in a formal sense, two or more of the functional groups that occur in their name per molecule.

An "aliphatic polyamine" is a polyamine whose amino groups are bonded to an aliphatic or cycloaliphatic or arylaliphatic radical.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

An "amine hydrogen" refers to the hydrogen atoms of primary and secondary amino groups.

An "amine hydrogen equivalent weight" refers to the mass of an amine or an amine-containing composition that contains one molar equivalent of amine hydrogen.

"Molecular weight" refers to the molar mass (in g/mol) of a molecule. "Average molecular weight" is the number average $M_n$ of a polydisperse mixture of oligomeric or polymeric molecules, which is typically determined by means of gel permeation chromatography (GPC) against polystyrene as standard.

"Viscosity" refers to the dynamic viscosity or shear viscosity which is defined by the ratio between the shear stress and the shear rate (speed gradient) and is determined as described in the working examples.

A substance or composition is referred to as "storage-stable" or "storable" when it can be stored at room temperature in a suitable container over a prolonged period, typically over at least 3 months up to 6 months or more, without any change in its application or use properties to a degree of relevance for the use thereof as a result of the storage.

The abbreviation "VOC" stands for "volatile organic compounds", i.e. volatile organic substances having a vapor pressure of at least 0.01 kPa at 293.14 K. "Solvent" is a liquid which dissolves the polymer containing silane groups and/or the liquid epoxy resin and which is a VOC and contains no groups that are reactive toward silane or epoxide groups.

A dotted line in the formulae in this document in each case represents the bond between a substituent and the corresponding molecular radical.

"Room temperature" refers to a temperature of 23° C.

The composition comprises at least one polymer which is liquid at room temperature and contains silane groups.

This is preferably an organic polymer containing silane groups, more particularly a polyolefin, poly(meth)acrylate or polyether or a mixed form of these polymers, each of which bears one or preferably more than one silane group. The silane groups may be pendant from the chain or terminal.

In particular, the polymer containing silane groups is a polyether containing silane groups. This polyether preferably has a majority of oxyalkylene units, more particularly 1,2-oxypropylene units.

The polymer containing silane groups and liquid at room temperature has an average of preferably 1.3 to 4, especially 1.5 to 3, more preferably 1.7 to 2.8, silane groups per molecule. The silane groups are preferably terminal.

Preferred silane groups are trimethoxysilane groups, dimethoxymethylsilane groups or triethoxysilane groups.

The polymer containing silane groups and liquid at room temperature preferably has an average molecular weight, determined by means of GPC relative to a polystyrene standard, in the range from 1000 to 20 000 g/mol, in particular from 2000 to 15 000 g/mol.

The polymer containing silane groups preferably comprises end groups of the formula (II),

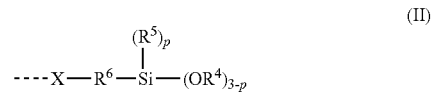

(II)

where p stands for a value of 0 or 1 or 2, preferably 0 or 1, more particularly 0, $R^4$ is a linear or branched, monovalent hydrocarbyl radical having 1 to 5 carbon atoms, $R^5$ is a linear or branched, monovalent hydrocarbyl radical having 1 to 8 carbon atoms, especially methyl or ethyl, $R^6$ is a linear or branched, divalent hydrocarbyl radical which has 1 to 12 carbon atoms and which optionally contains cyclic and/or aromatic moieties and optionally one or more heteroatoms, especially one or more nitrogen atoms, X is a divalent radical selected from —O—, —S—, —N($R^7$)—, —N($R^7$)—CO—, —O—CO—N($R^7$)—, —N($R^7$)—CO—O—, —N($R^7$)—CO—N($R^7$)—, —N($R^7$)—CO—O—CH(CH$_3$)—CO—N($R^7$)—, —N($R^7$)—CO—O—CH($R^8$)—CH$_2$—CH$_2$—CO—N($R^7$)— and —N($R^7$)—CO—O—CH(CH$_3$)—CH$_2$—O—CO—N($R^7$)—, where $R^7$ is a hydrogen atom or is a linear or branched hydrocarbyl radical which has 1 to 20 carbon atoms and which optionally contains cyclic moieties, and which optionally contains an alkoxysilyl group or ether or carboxylic ester groups, and $R^8$ is an unbranched alkyl radical having 1 to 6 carbon atoms, more particularly methyl.

Preferably $R^4$ is methyl or is ethyl or is isopropyl.

More preferably, $R^4$ is methyl. Polymers of this kind containing silane groups are particularly reactive.

More preferably, moreover, $R^4$ is ethyl. Polymers of this kind containing silane groups are particularly stable on storage and toxicologically advantageous.

Preferably, $R^5$ is methyl.

Preferably, $R^6$ is 1,3-propylene or 1,4-butylene, where butylene may be substituted by one or two methyl groups.

More preferably, $R^6$ is 1,3-propylene.

Processes for preparing polyethers containing silane groups are known to the person skilled in the art.

In one process, polyethers containing silane groups are obtainable from the reaction of polyethers containing allyl groups with hydrosilanes (hydrosilylation), optionally with chain extension using, for example, diisocyanates.

In another process, polyethers containing silane groups are obtainable from the copolymerization of alkylene oxides and epoxysilanes, optionally with chain extension using, for example, diisocyanates.

In a further process, polyethers containing silane groups are obtainable from the reaction of polyether polyols with isocyanatosilanes, optionally with chain extension using diisocyanates.

In a further process, polyethers containing silane groups are obtainable from the reaction of polyethers containing isocyanate groups, especially NCO-terminated urethane polyethers from the reaction of polyether polyols with a superstoichiometric amount of polyisocyanates, with aminosilanes, hydroxysilanes or mercaptosilanes. Polyethers containing silane groups from this process are particularly preferred. This process enables the use of a multitude of inexpensive starting materials of good commercial availability, by means of which it is possible to obtain different polymer properties, for example high stretchability, high strength, low glass transition temperature, or high resistance to hydrolysis.

Preferred polyethers containing silane groups are obtainable from the reaction of NCO-terminated urethane polyethers with aminosilanes or hydroxysilanes. NCO-terminated urethane polyethers suitable for this purpose are obtainable from the reaction of polyether polyols, especially polyoxyalkylenediols or polyoxyalkylenetriols, preferably polyoxypropylenediols or polyoxypropylenetriols, with a superstoichiometric amount of polyisocyanates, especially diisocyanates.

Preferably, the reaction between the polyisocyanate and the polyether polyol is conducted with exclusion of moisture at a temperature of 50° C. to 160° C., optionally in the presence of suitable catalysts, with metered addition of the polyisocyanate in such a way that the isocyanate groups thereof are present in a stoichiometric excess in relation to the hydroxyl groups of the polyol. More particularly, the excess of polyisocyanate is chosen such that a content of free isocyanate groups in the range from 0.1% to 10% by weight, preferably 0.2% to 5% by weight, more preferably 0.3% to 3% by weight, based on the overall polymer, remains in the resulting urethane polyether after the reaction of all hydroxyl groups.

Preferred diisocyanates are selected from the group consisting of hexamethylene 1,6-diisocyanate (HDI), 1-isocyanato-3,3,5-trimethyl-5-isocyanatomethylcyclohexane (=isophorone diisocyanate or IPDI), tolylene 2,4- and 2,6-diisocyanate and any desired mixtures of these isomers (TDI) and diphenylmethane 4,4'-, 2,4'- and 2,2'-diisocyanate and any desired mixtures of these isomers (MDI). Particular preference is given to IPDI or TDI. Most preferred is IPDI. In this way, polyethers containing silane groups with particularly good lightfastness are obtained.

Especially suitable as polyether polyols are polyoxyalkylenediols or polyoxyalkylenetriols having a degree of unsaturation lower than 0.02 meq/g, especially lower than 0.01 meq/g, and an average molecular weight in the range from 400 to 20 000 g/mol, especially 1000 to 15 000 g/mol.

As well as polyether polyols, it is also possible to use proportions of other polyols, especially polyacrylate polyols or polyester polyols, and also low molecular weight diols or triols.

Suitable aminosilanes for the reaction with an NCO-terminated urethane polyether are primary or secondary aminosilanes. Preference is given to 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts formed from primary amino-silanes such as 3-aminopropyltrimethoxysilane, 3-aminopropyldimethoxy-methylsilane or N-(2-aminoethyl)-3-aminopropyltrimethoxysilane and Michael acceptors such as acrylonitrile, (meth)acrylic esters, (meth)acrylamides, maleic or fumaric diesters, citraconic diesters or itaconic diesters, especially dimethyl or diethyl N-(3-trimethoxysilylpropyl)aminosuccinate. Likewise suitable are analogs of the aminosilanes mentioned with ethoxy or isopropoxy groups in place of the methoxy groups on the silicon.

Suitable hydroxysilanes for the reaction with an NCO-terminated urethane polyether are especially obtainable from the addition of aminosilanes onto lactones or onto cyclic carbonates or onto lactides.

Preferred hydroxysilanes of this kind are N-(3-triethoxysilylpropyl)-2-hydroxypropanamide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanamide, N-(3-triethoxysilylpropyl)-5-hydroxydecanamide or N-(3-triethoxysilylpropyl)-2-hydroxypropyl carbamate.

Further suitable hydroxysilanes are obtainable from the addition of aminosilanes onto epoxides or from the addition of amines onto epoxysilanes. Preferred hydroxysilanes of this kind are 2-morpholino-4(5)-(2-trimethoxysilylethyl)cyclohexan-1-ol, 2-morpholino-4(5)-(2-triethoxysilyl-ethyl) cyclohexan-1-ol or 1-morpholino-3-(3-(triethoxysilyl) propoxy)propan-2-ol.

Further suitable polyethers containing silane groups are commercially available products, especially the following: MS Polymer™ (from Kaneka Corp.; especially the S203H, S303H, S227, S810, MA903 and S943 products); MS Polymer™ or Silyl™ (from Kaneka Corp.; especially the SAT010, SAT030, SAT200, SAX350, SAX400, SAX725, MAX450, MAX951 products); Excestar® (from Asahi Glass Co. Ltd.; especially the S2410, S2420, S3430, S3630 products); SPUR+* (from Momentive Performance Materials; especially the 1010LM, 1015LM, 1050MM products); Vorasil™ (from Dow Chemical Co.; especially the 602 and 604 products); Desmoseal® (from Covestro; especially the S XP 2458, S XP 2636, S XP 2749, S XP 2774 and S XP 2821 products), TEGOPAC® (from Evonik Industries AG; especially the Seal 100, Bond 150, Bond 250 products), Polyvest® (from Evonik; especially the EP ST-M and EP ST-E products), Polymer ST (from Hanse Chemie AG/Evonik Industries AG, especially the 47, 48, 61, 61LV, 77, 80, 81 products); Geniosir STP (from Wacker Chemie AG; especially the E10, E15, E30, E35 products) or Arufon (from Toagosei, especially the US-6100 or US-6170 products).

Particularly preferred as polymer containing silane groups is a polyether containing silane groups which in addition to silane groups also contains urethane groups and/or urea groups. These result typically from the reaction of isocyanate groups with hydroxyl groups or with primary or secondary amino groups. A polymer of this kind containing silane groups enables particularly rapid curing and particularly good mechanical properties, more particularly a high tensile strength with high stretchability.

The amount of polymer containing silane groups in the composition is preferably in the range from 10 to 80% by weight, more preferably in the range from 15 to 70% by weight, more particularly in the range from 15 to 60% by weight.

The composition further comprises at least one liquid epoxy resin. Suitable liquid epoxy resin comprises customary technical epoxy resins which are flowable at room temperature and have a glass transition temperature of below 25° C. They are obtained in a known way, more particularly from the glycidylization of compounds having at least two active hydrogen atoms, more particularly polyphenols, polyols or amines, through reaction with epichlorohydrin.

Suitable liquid epoxy resins are, in particular, aromatic liquid epoxy resins, especially the glycidylization products of:

bisphenol A, bisphenol F or bisphenol A/F, where A stands for acetone and F for formaldehyde, which served as reactants for preparation of these bisphenols. In the case of bisphenol F, positional isomers may also be present, especially derived from 2,4'- or 2,2'-hydroxyphenylmethane.

dihydroxybenzene derivatives such as resorcinol, hydroquinone or catechol;

further bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl) ether or bis(4-hydroxyphenyl) sulfone;

condensation products of phenols with formaldehyde that are obtained under acidic conditions, such as phenol novolaks or cresol novolaks, also called bisphenol F novolaks;

aromatic amines such as aniline, toluidine, 4-aminophenol, 4,4'-methylenediphenyldiamine, 4,4'-methylenediphenyldi(N-methyl)amine, 4,4'-[1,4-phenylenebis(1-methylethylidene)]bisaniline (bisaniline P) or 4,4'-[1,3-phenylenebis(1-methylethylidene)]bisaniline (bisaniline M).

Further suitable liquid epoxy resins are aliphatic or cycloaliphatic polyepoxides, especially glycidyl ethers of saturated or unsaturated, branched or unbranched, cyclic or open-chain di-, tri- or tetrafunctional $C_2$ to $C_{30}$ alcohols, especially ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;

a hydrogenated bisphenol A, F or A/F liquid resin, or the glycidylization products of hydrogenated bisphenol A, F or A/F;

an N-glycidyl derivative of amides or heterocyclic nitrogen bases, such as triglycidyl cyanurate or triglycidyl isocyanurate, or reaction products of epichlorohydrin with hydantoin.

epoxy resins from the oxidation of olefins such as, in particular, vinylcyclohexene, dicyclopentadiene, cyclohexadiene, cyclododecadiene, cyclododecatriene, isoprene, 1,5-hexadiene, butadiene, polybutadiene or divinylbenzene.

A liquid epoxy resin based on a bisphenol is preferred.

Particularly preferred is a liquid epoxy resin based on a diglycidyl ether of bisphenol A, bisphenol F or bisphenol A/F, as are commercially available, for example, from Dow, Huntsman or Momentive. These liquid epoxy resins have readily manageable viscosity and enable high strengths and resistances. Such liquid resins may also include fractions of solid bisphenol A resin or phenol novolaks.

The amount of liquid epoxy resin in the composition is preferably in the range from 5% to 50% by weight, especially 10% to 40% by weight. A composition of this kind exhibits high strength in conjunction with good stretchability.

The weight ratio between polymer containing silane groups and liquid epoxy resin in the composition is preferably in the range from 80/20 to 30/70, especially 70/30 to 40/60, more preferably 60/40 to 45/55. A composition of this kind exhibits high strength in conjunction with good stretchability and allows particularly good processing qualities.

Where the composition comprises plasticizers, the weight ratio in the composition between the sum total of plasticizer plus polymer containing silane groups and liquid epoxy resin is preferably in the range from 80/20 to 45/55, especially 70/30 to 50/50.

The composition further comprises at least one aliphatic polyamine having a molecular weight of at least 115 g/mol and containing at least three amine hydrogens that are reactive toward epoxide groups.

Suitable such polyamines are in particular the following:

aliphatic, cycloaliphatic or arylaliphatic primary diamines, especially 1,5-diamino-2-methylpentane (MPMD), 2-butyl-2-ethylpentane-1,5-diamine (C11 neodiamine), hexane-1,6-diamine, 2,5-dimethylhexane-1,6-diamine, 2,2(4),4-trimethylhexamethylenediamine (TMD), heptane-1,7-diamine, octane-1,8-diamine, nonane-1,9-diamine, decane-1,10-diamine, undecane-1,11-diamine, dodecane-1,12-diamine, bis(4-aminocyclohexyl)methane ($H_{12}$-MDA), bis(4-amino-3-methylcyclohexyl)-methane, bis(4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (isophoronediamine or IPDA), 2- or 4-methyl-1,3-diaminocyclohexane or mixtures thereof, 1,3-bis(aminomethyl)cyclohexane, 1,4-bis(aminomethyl)cyclohexane, 2,5(2,6)-bis(aminomethyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), menthane-1,8-diamine, 3,9-bis(3-aminopropyl)-2,4,8,10-tetraoxaspiro[5.5]undecane, 1,3-bis(aminomethyl)benzene (MXDA) or 1,4-bis(aminomethyl)benzene;

aliphatic primary di- or triamines containing ether groups, especially 3,6-dioxaoctane-1,8-diamine, 4,7-dioxadecane-1,10-diamine, 4,7-dioxadecane-2,9-diamine, 4,9- dioxadodecane-1,12-diamine, 5,8-dioxadodecane-3,10-diamine, 4,7,10-trioxatridecane-1,13-diamine or higher oligomers of these diamines, bis(3-aminopropyl)polytetrahydrofurans or other polytetrahydrofurandiamines, diamines containing cycloaliphatic ether groups from the propoxylation and subsequent amination of 1,4-dimethylolcyclohexane, especially obtainable as Jeffamine® RFD-270 (from Huntsman), or polyoxyalkylenedi- or -triamines that are typically products from the amination of polyoxyalkylenedi- or -triols and are obtainable, for example, under the Jeffamine® name (from Huntsman), under the Polyetheramine name (from BASF) or under the PC Amine® name (from Nitroil). Especially suitable polyoxyalkylenedi- or -triamines are Jeffamine® D-230, Jeffamine® D-400, Jeffamine® D-2000, Jeffamine® EDR-104, Jeffamine® EDR-148, Jeffamine® EDR-176, Jeffamine® T-403, Jeffamine® T-3000, Jeffamine® T-5000, or corresponding amines from BASF or Nitroil;

polyamines having secondary amino groups and having two primary aliphatic amino groups, such as, in particular, 3-(2-aminoethyl)aminopropylamine, bis(hexamethylene)triamine (BHMT), triethylenetetramine (TETA), tetraethylenepentamine (TEPA), pentaethylenehexamine (PEHA) or higher homologs of linear polyethyleneamines such as polyethylenepolyamine having 5 to 7 ethyleneamine units (called "higher ethylenepolyamine", HEPA), products from the multiple cyanoethylation or cyanobutylation and subsequent hydrogenation of primary di- and polyamines having at least two primary amino groups, such as dipropylenetriamine (DPTA), N-(2-aminoethyl)propane-1,3-diamine (N3 amine), N,N'-bis(3-aminopropyl)ethylenediamine (N4 amine), N,N'-bis(3-aminopropyl)-1,4-diaminobutane, N5-(3-aminopropyl)-2-methylpentane-1,5-diamine, N3-(3-aminopentyl)pentane-1,3-diamine, N5-(3-amino-1-ethylpropyl)-2-methylpentane-1,5-diamine or N,N'-bis(3-amino-1-ethylpropyl)-2-methylpentane-1,5-diamine;

polyamines having tertiary amino groups, such as, in particular, N,N-dimethyldi(1,3-propylene)triamine (DMAPAPA), N,N'-bis(aminopropyl)piperazine, N,N-bis(3-aminopropyl)methylamine, N,N-bis(3-aminopropyl)ethylamine, N,N-Bis(3-aminopropyl)propylamine, N,N-bis(3-aminopropyl)cyclohexylamine, N,N-bis(3-aminopropyl)-2-ethylhexylamine, products from the double cyanoethylation and subsequent reduction of fatty amines derived from natural fatty acids, such as N,N-bis(3-aminopropyl)dodecylamine or N,N-bis(3-aminopropyl)tallowalkylamine, available as Triameen® Y12D or Triameen® YT (from Akzo Nobel);

aliphatic, cycloaliphatic or arylaliphatic primary triamines, especially 4-aminomethyloctane-1,8-diamine, 1,3,5-tris(aminomethyl)benzene, 1,3,5-tris(aminomethyl)cyclohexane, tris(2-aminoethyl)amine, tris(2-aminopropyl)amine or tris(3-aminopropyl)amine; or diamines having one primary and one secondary amino group, especially products from the reductive alkylation of primary aliphatic polyamines with aldehydes or ketones, such as, in particular, N-benzyl-1,3-bis(aminomethyl)benzene, N-2-ethylhexyl-1,3-bis(aminomethyl)benzene, N-benzyl-1,2-propanediamine, N-(4-methoxybenzyl)-1,2-propanediamine, N⁻(4-(dimethylamino)benzyl)-1,2-propanediamine, N-benzyl-1,2-ethanediamine, N-methylcyclohexyl-1,2-propanediamine, or partially styrolenized polyamines such as, in particular, styrolenized MXDA (available as Gaskamine® 240 from Mitsubishi Gas Chemical).

The aliphatic polyamine preferably has a molecular weight of at least 120 g/mol, especially at least 150 g/mol.

The aliphatic polyamine is especially selected from the group consisting of 2-butyl-2-ethyl-1,5-pentanediamine (C11 neodiamine), 2,2(4),4-trimethylhexamethylenediamine (TMD), 1-amino-3-aminomethyl-3,5,5-trimethylcyclohexane (IPDA), 2- or 4-methyl-1,3-diaminocyclohexane or mixtures thereof, 1,3-bis(aminomethyl)cyclohexane, 1,4-bis(aminomethyl)cyclohexane, 2,5(2,6)-bis(aminomethyl)bicyclo[2.2.1]heptane (NBDA), 1,3-bis(aminomethyl)benzene (MXDA), 1,4-bis(aminomethyl)benzene, polyoxyalkylenediamines or -triamines having an average molecular weight in the range from 200 to 500 g/mol, and diamines having one primary and one secondary amino group and a molecular weight of at least 150 g/mol. Preferred among these are polyamines having a molecular weight of at least 150 g/mol, i.e., C11 neodiamine, TMD, IPDA, NBDA, polyoxyalkylenediamines or -triamines having an average molecular weight in the range from 200 to 500 g/mol, and diamines having one primary and one secondary amino group and a molecular weight of at least 150 g/mol.

Particularly preferred among these is a polyoxyalkylenediamine or -triamine having an average molecular weight in the range from 200 to 500 g/mol, especially Jeffamine® D-230 or Jeffamine® D-400 or Jeffamine® T-403 (all from Huntsman), or corresponding amines from BASF or Nitroil. These polyamines have a low susceptibility to carbamatization. They enable liquid applied sealing membranes having particularly good workability and good mechanical properties.

Further particularly preferred are diamines having one primary and one secondary amino group and a molecular weight of at least 150 g/mol.

With very particular preference the aliphatic polyamine is an amine of the formula (I),

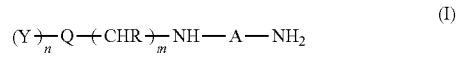

$$(Y)_n \text{—} Q \text{—} (CHR)_m \text{—} NH \text{—} A \text{—} NH_2 \quad (I)$$

where
A is an alkylene radical having 2 to 15 carbon atoms which optionally contains one or more nitrogen atoms,
R each independently is a hydrogen or methyl or phenyl radical,
Q is a five-, six- or seven-membered cycloalkyl or aryl radical optionally having an oxygen, sulfur or nitrogen atom in the ring and having 4 to 7 carbon atoms,
Y represents identical or different radicals selected from the group consisting of alkyl, alkoxy and dialkylamino having 1 to 18 carbon atoms,
m is 1 or 2, and
n is 0 or 1 or 2 or 3.

Comparatively speaking, the amines of the formula (I) are not very susceptible to carbamatization. As a result they allow sealing membranes to be obtained which, on application in the cold and/or under high atmospheric humidity, show no signs of curing defects, these defects being caused by formation of salts (carbamatization) by the amines present with $CO_2$ (known as blushing) and being manifested in particular in the form of reduced strength. By virtue of the amines of the formula (I), the resulting liquid-applied sealing membranes have good workability and particularly good mechanical properties.

A is preferably selected from the group consisting of 1,2-ethylene, 1,2-propylene, 1,3-propylene, 2-methyl-1,5-pentylene, 1,6-hexylene, 2,2(4),4-trimethyl-1,6-hexylene, 1,3-cyclohexylenebis(methylene), 1,3-phenylenebis(methylene), (1,5,5-trimethylcyclohexan-1-yl)methane-1,3, 3-aza-1,5-pentylene, 3,6-diaza-1,8-octylene, 3,6,9-triaza-1,11-undecylene, 4-aza-1,7-heptylene, 3-aza-1,6-hexylene, 4,7-diaza-1,10-decylene, and 7-aza-1,13-tridecylene.

Preferred among these is 1,2-propylene. These amines have a particularly low propensity to carbamatization and result in sealing membranes having little tendency to yellow.

Preference among these is also given to 1,3-phenylenebis(methylene). These amines have a low propensity toward carbamatization and result in particularly high strength.

R independently at each occurrence is preferably a hydrogen radical or is methyl, and more particularly is in each case a hydrogen radical. These amines are particularly easy to obtain and have a particularly low viscosity.

Preferably, Q is an optionally Y-substituted phenyl radical. These amines have a particularly low propensity toward carbamatization.

Y preferably represents identical or different radicals selected from the group consisting of alkyl, alkoxy and dialkylamino each having 1 to 12, especially 1 to 4, carbon atoms. More preferably, Y is methyl or is methoxy or is dimethylamino. Most preferably, Y is methoxy or is dimethylamino.

Preferably, the Y radical is in the meta and/or para position. Where n=1, the Y radical is located in particular in the para position.

n is preferably 0 or 1 or 2, more particularly 0 or 1.

More preferably, n is 0. These amines result in particularly good workability.

If n is 1, Q is especially a Y-substituted phenyl radical and Y is especially methoxy or dimethylamino.

More preferably, A is 1,2-propylene, R is a hydrogen radical, Q is a phenyl radical, m is 1, and n is 0. These amines result in especially good workability, particularly high strength, and low tendency to yellow.

With particular preference, moreover, A is 1,3-phenylenebis(methylene), R is a hydrogen radical, Q is a phenyl radical, m is 1 and n is 0. This amine results in especially good workability and particularly high strength.

With particular preference, moreover, A is 1,3-phenylenebis(methylene), R in each case is a hydrogen radical, Q is a phenyl radical, m is 2, and n is 0. This amine results in especially good workability and particularly high strength. This amine is available commercially as a constituent of Gaskamine® 240 (from Mitsubishi Gas Chemical).

The amine of the formula (I) is preferably selected from the group consisting of N-benzyl-1,2-ethanediamine, N-(4-methoxybenzyl)-1,2-ethanediamine, N-(4-(dimethylamino)benzyl)-1,2-ethanediamine, $N^1$-benzyl-1,2-propanediamine or $N^2$-benzyl-1,2-propanediamine or a mixture of these isomers, $N^1$-(4-methoxybenzyl)-1,2-propanediamine or $N^2$-(4-methoxybenzyl)-1,2-propanediamine or a mixture of these isomers, $N^1$-(4-(dimethylamino)benzyl)-1,2-propanediamine or $N^2$-(4-(dimethylamino)benzyl)-1,2-propanediamine or a mixture of these isomers, N-benzyl-1,3-bis(aminomethyl)benzene and N-phenylethyl-1,3-bis(aminomethyl)benzene.

Preferred among these is $N^1$-benzyl-1,2-propanediamine or $N^2$-benzyl-1,2-propanediamine or a mixture of these isomers. These amines are obtainable in particular from the reductive alkylation of 1,2-propylenediamine with benzaldehyde and hydrogen. They are used in particular as a reaction product purified by distillation.

Further preferred among these is N-benzyl-1,3-bis(aminomethyl)benzene. This amine is obtainable in particular from the reductive alkyation of 1,3-bis(aminomethyl)benzene with benzaldehyde and hydrogen. It is used in particular as a reaction product containing fractions of N,N'-dibenzyl-1,3-bis(aminomethyl)benzene.

Further preferred among these is N-phenylethyl-1,3-bis(aminomethyl)benzene. It is obtainable in particular from the reaction of 1,3-bis(aminomethyl)benzene with styrene. It is used in particular as a constituent of the commercially available Gaskamine® 240 (from Mitsubishi Gas Chemical).

The amount of amine of the formula (I) in the composition is preferably such that the number of amine hydrogens in the amine of the formula (I) corresponds to 25 to 150%, more particularly 30 to 130%, of the number of epoxide groups present.

It may be advantageous to use a mixture of two or more aliphatic polyamines. Preferred are mixtures comprising at least one polyoxyalkylenediamine or -triamine having an average molecular weight in the range from 200 to 500 g/mol and at least one further polyamine selected from the group consisting of 2,2(4),4-trimethylhexamethylenediamine (TMD), 1-amino-3-aminomethyl-3,5,5-trimethylcyclohexane (IPDA), 2- or 4-methyl-1,3-diaminocyclohexane or mixtures thereof, 1,3-bis(aminomethyl)cyclohexane, 1,4-bis(aminomethyl)cyclohexane, 2,5(2,6)-bis(aminomethyl)bicyclo[2.2.1]heptane (NBDA), and 1,3-bis(aminomethyl)benzene (MXDA).

The weight ratio here between the polyoxyalkylenediamine or -triamine and other polyamines is preferably in the range from 99/1 to 20/80, especially 95/5 to 30/70.

Further preferred are mixtures comprising at least one amine of the formula (I) and at least one further polyamine selected from the group consisting of 2,2(4),4-trimethylhexamethylenediamine (TMD), 1-amino-3-aminomethyl-3,5,5-trimethylcyclohexane (IPDA), 1,3-bis(aminomethyl)cyclohexane, 1,4-bis(aminomethyl)cyclohexane, 2,5(2,6)-bis(aminomethyl)bicyclo[2.2.1]heptane (NBDA), 1,3-bis(aminomethyl)benzene (MXDA), and polyoxyalkylenediamines or -triamines having an average molecular weight in the range from 200 to 500 g/mol.

Among these, preference is given to polyoxyalkylenediamines or -triamines having an average molecular weight in the range from 200 to 500 g/mol. The weight ratio here between polyoxyalkylenediamines or -triamines and amines of the formula (I) is preferably in the range from 90/10 to 10/90, especially 70/30 to 20/80.

The composition is preferably free from amine-epoxide adducts. Adducting with epoxides raises the viscosity of the amine, this being a disadvantage for the processing of the composition as a sheetlike, self-leveling sealing membrane.

The composition preferably comprises only polyamines which are present in liquid form at room temperature. Such polyamines are particularly easy to manage.

The composition preferably further comprises at least one aminosilane or epoxysilane or mercaptosilane.

A suitable epoxysilane is especially 3-glycidoxypropyltrimethoxysilane or 3-glycidoxypropyldimethoxymethylsilane or 3-glycidoxypropyltriethoxysilane. A suitable mercaptosilane is especially 3-mercaptopropyltrimethoxysilane or 3-mercaptopropyldimethoxymethylsilane or 3-mercaptopropyltriethoxysilane.

With particular preference the composition comprises at least one aminosilane. A suitable aminosilane is especially selected from the group consisting of 3-aminopropyltrimethoxysilane, N-(2-aminoethyl)-3-aminopropyltrimethoxysilane, 3-amino-2-methylpropyltrimethoxysilane, 4-aminobutyltrimethoxysilane, 4-amino-3,3-dimethylbutyltrimethoxysilane, 3-aminopropyldimethoxymethylsilane, N-(2-aminoethyl)-3-aminopropyldimethoxymethylsilane and N-(2-aminoethyl)-N'-[3-(trimethoxysilyl)propyl]ethylenediamine, and also analogs thereof with ethoxy groups instead of the methoxy groups on the silicon.

Particularly preferred among these is 3-aminopropyltrimethoxysilane, 3-aminopropyltriethoxysilane, N-(2-aminoethyl)-3-aminopropyltrimethoxysilane or N-(2-aminoethyl)-3-aminopropyltriethoxysilane.

The composition preferably contains aminosilane in an amount in the range from 0.1% to 5% by weight, especially in the range from 0.2% to 3% by weight. Such compositions have particularly high strength.

The composition is preferably a two-component composition consisting of a first component and a second component which are produced, packed, and stored separately from one another, the aliphatic polyamine not being present in the same component as the liquid epoxy resin.

Any aminosilane or mercaptosilane present is preferably in the same component as the aliphatic polyamine.

Any epoxysilane present is preferably in the same component as the liquid epoxy resin.

With preference all the constituents that are reactive toward epoxy groups are not in the same component as the liquid epoxy resin.

With further preference the composition is a three-component composition consisting of a first component, a second component, and a third component, which are produced, packed, and stored separately from one another, where the liquid epoxy resin, the aliphatic polyamine, and the polymer containing silane groups are each present in a separate component.

In a preferred embodiment of the invention, the composition comprises a first component comprising
at least one polymer which is liquid at room temperature and contains silane groups, and
at least one liquid epoxy resin,
and a second component comprising
at least one aliphatic polyamine having a molecular weight of at least 115 g/mol and containing at least three amine hydrogens that are reactive toward epoxide groups, and
optionally at least one aminosilane.

In a further preferred embodiment of the invention, the composition comprises a first component comprising
at least one polymer which is liquid at room temperature and contains silane groups,
at least one aliphatic polyamine having a molecular weight of at least 115 g/mol and containing at least three amine hydrogens that are reactive toward epoxide groups, and
optionally at least one aminosilane.
and a second component comprising
at least one liquid epoxy resin.

In another preferred embodiment of the invention, the composition comprises
a first component comprising at least the liquid epoxy resin,
a second component comprising at least the aliphatic polyamine having a molecular weight of at least 115 g/mol, and containing at least three amine hydrogens that are reactive toward epoxide groups,
and a third component comprising at least the polymer which is liquid at room temperature and contains silane groups, and optionally at least one amino-, mercapto- or epoxysilane.

This division of the components incorporates the attractive possibility of combining a commercial epoxy resin coating, as for example a primer, a finishing coat or a topcoat, consisting of a first component and a second component, with a third component comprising the polymer containing silane groups.

Each of these possibilities may feature, as an additional component, adjuvants such as fillers, fibers, rubber pellets or the like, which are packaged separately and processed when mixing the components together.

With all of these embodiments, the components on their own are each stable on storage in the absence of moisture. When the components are mixed, primary and/or secondary amino groups react with epoxide groups that are present. Silane groups react and release alcohol when they come into contact with water.

In one embodiment of the invention, the composition comprises water or a water-releasing substance. A composition of this kind has the advantage that the water needed for the crosslinking of the silane groups does not have to be taken up from the environment.

With preference in this case the epoxy resin is not present in the form of an aqueous emulsion.

The composition preferably contains a total of up to 1% by weight of free or releasable water. Such a composition cures rapidly, even where there is little atmospheric humidity, and it exhibits only a little contraction, this being particularly important for a liquid sealing membrane for large-area application.

With preference the composition additionally comprises at least one further constituent selected from driers, accelerators, and plasticizers.

Particularly suitable driers are tetraethoxysilane, vinyltrimethoxysilane, vinyltriethoxysilane, organosilanes having a functional group in α-position to the silane group, especially N-(methyldimethoxysilylmethyl)-O-methylcarbamate or (methacryloyloxymethyl)silanes, methoxymethylsilanes, orthoformic esters, and also calcium oxide or molecular sieves.

With particular preference the composition comprises vinyltrimethoxysilane or vinyltriethoxysilane. Here, vinyltrimethoxysilane is preferred when the polymer containing silane groups has methoxysilane groups, while vinyltriethoxysilane is preferred when the polymer containing silane groups has ethoxysilane groups.

In the case of a two-component composition, the drier, more particularly the vinyltrimethoxy- or -triethoxysilane, is preferably in the same component as the polymer containing silane groups.

Suitable accelerators are substances which accelerate the crosslinking of polymers containing silane groups. Particularly suitable for this purpose are metal catalysts and/or nitrogen-containing compounds.

Suitable metal catalysts are compounds of titanium, zirconium, aluminum, or tin, especially organotin compounds, organotitanates, organozirconates or organoaluminates, these metal catalysts having, in particular, alkoxy groups, aminoalkoxy groups, sulfonate groups, carboxyl groups, 1,3-diketonate groups, 1,3-ketoesterate groups, dialkyl phosphate groups or dialkyl pyrophosphate groups.

Particularly suitable organotin compounds are dialkyltin oxides, dialkyltin dichlorides, dialkyltin dicarboxylates or dialkyltin diketonates, especially dibutyltin oxide, dibutyltin dichloride, dibutyltin diacetate, dibutyltin dilaurate, dibutyltin diacetylacetonate, dioctylyin oxide, dioctylyin dichloride, dioctyltin diacetate, dioctyltin dilaurate or dioctyltin diacetylacetonate, and also alkyltin thioesters.

Particularly suitable organotitanates are bis(ethylacetoacetato)diisobutoxytitanium(IV), bis(ethylacetoacetato)diisopropoxytitanium(IV), bis(acetylacetonato)diisopropoxytitanium(IV), bis(acetylacetonato)diisobutoxytitanium(IV), tris(oxyethyl)amine-isopropoxy-titanium(IV), bis[tris(oxyethyl)-amine]diisopropoxytitanium(IV), bis(2-ethylhexane-1,3-dioxy)titanium(IV), tris[2-((2-aminoethyl)amino)ethoxy]ethoxytitanium(IV), bis(neopentyl(diallyl)oxy)-diethoxytitanium(IV), titanium(IV) tetrabutoxide, tetra(2-ethylhexyloxy) titanate, tetra(isopropoxy) titanate or polybutyl titanate. Especially suitable are the commercially available products Tyzor® AA, GBA, GBO, AA-75, AA-65, AA-105, DC, BEAT, BTP, TE, TnBT, KTM, TOT, TPT or IBAY (all from Dorf Ketal); Tytan PBT, TET, X85, TAA, ET, S2, S4 or S6 (all from Borica Company Ltd.) and Ken-React® KR® TTS, 7, 9QS, 12, 26S, 33DS, 38S, 39DS, 44, 134S, 138S, 133DS, 158FS or LICA® 44 (all from Kenrich Petrochemicals). Particularly suitable organozirconates are the commercially available products Ken-React® NZ® 38J, KZ® TPPJ, KZ® TPP, NZ® 01, 09, 12 38, 44 or 97 (all from Kenrich Petrochemicals) or Snapcure® 3020, 3030, 1020 (all from Johnson Matthey & Brandenberger).

A particularly suitable organoaluminate is the commercially available product K-Kat 5218 (from King Industries).

Nitrogen-containing compounds with particular suitability as accelerators are amines such as, in particular, N-ethyldiisopropylamine, N,N,N',N'-tetramethylalkylenediamines, polyoxyalkyleneamines, 1,4-diazabicyclo[2.2.2]octane; amidines such as, in particular, 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene; guanidines such as, in particular, tetramethylguanidine, 2-guanidinobenzimidazole, acetylacetoneguanidine, 1,3-di-o-tolylguanidine, 2-tert-butyl-1,1,3,3-tetramethylguanidine, or reaction products of carbodiimidenes and amines such as, in particular, polyetheramines or aminosilanes; or imidazoles such as, in particular, N-(3-trimethoxysilylpropyl)-4,5-dihydroimidazole or N-(3-triethoxysilylpropyl)-4,5-dihydroimidazole.

Also especially suitable are combinations of different accelerators for the crosslinking of polymers containing silane groups, more particularly combinations of at least one metal catalyst and at least one nitrogen-containing compound.

Preferred are organotin compounds, organotitanates, amines, amidines, guanidines or imidazoles.

Further substances suitable as accelerators are those which accelerate the reaction of epoxide groups with amino groups. Suitable for this purpose are especially acids or compounds hydrolyzable to acids, especially organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic esters, other organic or inorganic acids such as, in particular, phosphoric acid, or mixtures of the aforementioned acids and acid esters; tertiary amines such as, in particular, 1,4-diazabicyclo[2.2.2]octane, benzyldimethylamine, α-methylbenzyldimethylamine, triethanolamine, dimethylaminopropylamine, imidazoles such as, in particular, N-methylimidazole, N-vinylimidazole or 1,2-dimethylimidazole, salts of such tertiary amines, quaternary ammonium salts, such as, in particular, benzyltrimethylammonium chloride, amidines such as, in particular, 1,8-diazabicyclo[5.4.0]undec-7-ene, guanidines such as, in particular, 1,1,3,3-tetramethylguanidine, phenols, especially bisphenols, phenolic resins or Mannich bases such as, in particular, 2-(dimethylaminomethyl)phenol, 2,4,6-tris(dimethylaminomethyl)phenol or polymers of phenol, formaldehyde and N,N-dimethylpropane-1,3-diamine, phosphites such as, in particular, di- or triphenyl phosphites, or compounds having mercapto groups. Preferred are acids, tertiary amines or Mannich bases. Most preferred is salicylic acid or 2,4,6-tris(dimethylaminomethyl)phenol or a combination thereof.

Suitable plasticizers are especially carboxylic esters such as phthalates, especially diisononyl phthalate (DINP), diisodecyl phthalate (DIDP) or di(2-propylheptyl) phthalate (DPHP), hydrogenated phthalates, especially hydrogenated diisononyl phthalate (DINCH), terephthalates, especially dioctyl terephthalate, trimellitates, adipates, especially dioctyl adipate (DOA), azelates, sebacates, polyols, especially polyoxyalkene polyols or polyester polyols, benzoates, glycol ethers, glycol esters, organic phosphoric, phosphonic or sulfonic esters, polybutenes, polyisobutenes, or plasticizers derived from natural fats or oils, especially epoxidized soybean oil or linseed oil. Preferred is DINP, DIDP or DOA.

Further suitable plasticizers are flame-retardant plasticizers, especially organic phosphoric esters such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenyl phosphate) or bisphenol A bis(diphenyl phosphate). Diphenyl cresyl phosphate is preferred.

The composition preferably has a plasticizer content in the range from 5% to 30% by weight.

The weight ratio in the composition between polymer containing silane groups and plasticizer is preferably in the range from 90/10 to 50/50, especially 80/20 to 50/50.

Plasticizers improve the workability, increase the stretchability, lower the modulus of elasticity, and possibly reduce the flammability of the composition.

The composition may comprise further substances reactive toward epoxide groups, especially monoamines such as hexylamine or benzylamine or polyethermonoamines, particularly alcohol-started products such as Jeffamine® M-600, Jeffamine® M-1000, Jeffamine® M-2005, Jeffamine® M-2070, Jeffamine® XTJ-581, Jeffamine® XTJ-249 or Jeffamine® XTJ-435, or alkylphenol-started products such as Jeffamine® XTJ-436 (all from Huntsman);

aliphatic polyamines having a molecular weight of less than 115 g/mol, especially 1,2-ethanediamine, 1,2-propanediamine, 1,3-propanediamine, 2,2-dimethyl-1,3-propanediamine, 1,3-pentanediamine (DAMP), 1,5-pentanediamine, bis(2-aminoethyl) ether, diethylenetriamine (DETA) or 1,2- or 1,3- or 1,4-diaminocyclohexane;

Mannich bases obtained from the reaction of phenols with aldehydes, especially formaldehyde, and aliphatic or cycloaliphatic amines, especially phenalkamines, i.e., Mannich bases of cardanol (long-chain alk(en)ylphenols and -resorcinols obtained by thermal treatment of cashewnut-shell oil extracts, containing as main component 3-(pentadeca-8,11,14-trienyl)phenol, more particularly the commercial product Cardolite® NC-540, NC-557, NC-558, NC-566, Lite 2002, GX-6019, GX-6013, NX-4943, NX-5607 or NX-5608 (from Cardolite), Aradur® 3440, 3441, 3442 or 3460 (from Huntsman), or Beckopox® EH 614, EH 621, EH 624, EH 628 or EH 629 (from Cytec);

aromatic polyamines such as, in particular, m- and p-phenylenediamine, 4,4'-, 2,4'- and/or 2,2'-diaminodiphenylmethane, 3,3'-dichloro-4,4'-diaminodiphenylmethane (MOCA), tolylene-2,4- and/or -2,6-diamine, mixtures of 3,5-dimethylthiotolylene-2,4- and -2,6-diamine (available as Ethacure® 300 from Albermarle), mixtures of 3,5-diethyltolylene-2,4- and -2,6-diamine (DETDA, available as Ethacure® 100 from Albermarle), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diaminodiphenylsulfone (DDS), 4-amino-N-(4-aminophenyl)benzenesulfonamide, 5,5'-methylenedianthranilic acid, dimethyl 5,5'-methylenedianthranilate, propylene 1,3-bis(4-aminobenzoate), butylene 1,4-bis(4-aminobenzoate), polytetramethylene oxide bis(4-aminobenzoate) (available as Versalink® from Air Products), 1,2-bis(2-aminophenylthio)ethane, 2-methylpropyl 4-chloro-3,5-diaminobenzoate or tert-butyl (4-chloro-3,5-diaminobenzoate);

polyamidoamines, especially reaction products of a mono- or polybasic carboxylic acid, or the esters or anhydrides thereof, especially a dimer fatty acid, with an aliphatic, cycloaliphatic or aromatic polyamine used in a stoichiometric excess, especially a polyalkyleneamine, for example DETA or TETA, especially the commercially available polyamidoamines Versamid® 100, 125, 140 or 150 (from Cognis), Aradur® 223, 250 or 848 (from Huntsman), Euretek® 3607 or 530 (from Huntsman) or Beckopox® EH 651, EH 654, EH 655, EH 661 or EH 663 (from Cytec);

adducts of polyamines with epoxides or epoxy resins, especially adducts with diepoxides in a molar ratio of about 2/1, or adducts with monoepoxides in a molar ratio of about 1/1, or reaction products of polyamines and epichlorohydrin, especially those of 1,3-bis(aminomethyl)benzene, commercially available as Gaskamine® 328 (from Mitsubishi Gas Chemical);

liquid mercaptan-terminated polysulfide polymers, known by the Thiokol® brand name (from Morton Thiokol; available, for example, from SPI Supplies, or from Toray Fine Chemicals), especially the LP-3, LP-33, LP-980, LP-23, LP-55, LP-56, LP-12, LP-31, LP-32 or LP-2 products; and also known by the Thioplast® brand name (from Akzo Nobel), especially the G 10, G 112, G 131, G 1, G 12, G 21, G 22, G 44 or G 4 products;

mercaptan-terminated polyoxyalkylene ethers obtainable, for example, by reaction of polyoxyalkylenedi- or -triols either with epichlorohydrin or with an alkylene oxide, followed by sodium hydrogensulfide;

mercaptan-terminated compounds in the form of polyoxyalkylene derivatives, known by the Capcure® brand name (from Cognis), especially the WR-8, LOF or 3-800 products;

polyesters of thiocarboxylic acids, for example pentaerythritol tetramercaptoacetate, tri methylolpropane tri mercaptoacetate, glycol dimercaptoacetate, pentaerythritol tetra(3-mercaptopropionate), trimethylolpropane tri(3-mercaptopropionate) or glycol di(3-mercaptopropionate), or esterification products of polyoxyalkylenediols or -triols, ethoxylated trimethylolpropane or polyester diols with thiocarboxylic acids such as thioglycolic acid or 2- or 3-mercaptopropionic acid; or further compounds having mercapto groups, such as, in particular, 2,4,6-trimercapto-1,3,5-triazine, 2,2'-(ethylenedioxy)diethanethiol (triethylene glycol dimercaptan) or ethanedithiol.

Further suitable constituents of the composition are in particular the following auxiliaries and adjuvants:

adhesion promoters and/or crosslinkers, especially (meth) acrylosilanes, anhydridosilanes, carbamatosilanes, alkylsilanes or iminosilanes, or oligomeric forms of these silanes, or adducts of primary aminosilanes with epoxysilanes or (meth)acrylosilanes or anhydridosilanes;

solvents, diluents or extenders, such as especially xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethyl ether, diethylene glycol di-n-butyl ether, propylene glycol butyl ether, propylene glycol phenyl ether, dipropylene glycol, dipropylene glycol monomethyl ether, dipropylene glycol dimethyl ether, dipropylene glycol di-n-butyl ether, N-methylpyrrolidone, diphenylmethane, diisopropylnaphthalene, mineral oil fractions, for example Solvesso® products (from Exxon), alkylphenols such as tert-butylphenol, nonylphenol, dodecylphenol or cardanol (from cashewnut-shell oil, containing as main constituent, 3-(8,11,14-pentadeca-trienyl)phenol), styrenized phenol, bisphenols, aromatic hydrocarbon resins, especially types containing phenol groups, alkoxylated phenol, especially ethoxylated or propoxylated phenol, especially 2-phenoxyethanol, adipates, sebacates, phthalates, benzoates, organic phosphoric or sulfonic esters or sulfonamides;

reactive diluents, especially reactive diluents for epoxy resins such as cresyl glycidyl ether, benzyl glycidyl ether, tert-butylphenyl glycidyl ether, nonylphenyl glycidyl ether, 2-ethylhexyl glycidyl ether, glycidyl ethers of natural alcohols such as, in particular, $C_8$- to $C_{10}$-alkyl glycidyl ethers or $C_{12}$- to $C_{14}$-alkyl glycidyl ethers, or glycidylether of diols or polyols such as polypropylene glycols, dimethylolcyclohexane, glycerol, neopentyl glycol or trimethylolpropane, or, additionally, epoxidized natural oils such as soybean, linseed oil or palm kernel oil, or compounds containing acetoacetate groups, especially acetoacetylated polyols, or butyrolacton or carbonates or aldehydes or isocyanates, or silicones containing reactive groups;

inorganic or organic fillers, especially ground or precipitated calcium carbonates, optionally coated with fatty acids, especially stearates; baryte (heavy spar), talc, quartz flour, quartz sand, iron mica, dolomite, wollastonite, kaolin, mica (potassium aluminum silicate), molecular sieve, aluminum oxide, aluminum hydroxide, magnesium hydroxide, silica, cement, gypsum, fly ash, carbon black, graphite, metal powders such as aluminum, copper, iron, zinc, silver or steel, PVC powders or hollow spheres;

fibers, especially glass fibers, carbon fibers, metal fibers, ceramic fibers, polymer fibers such as polyamide fibers or polyethylene fibers, or natural fibers such as wool, cellulose, hemp or sisal;

inorganic or organic pigments, especially titanium dioxide, chromium oxide or iron oxide;

dyes;

rheology modifiers, especially thickeners, especially sheet silicates such as bentonites, derivatives of castor oil such as hydrogenated castor oil, polyamides, polyurethanes, urea compounds, polyvinyl chlorides, fumed silicas;

natural resins, fats or oils such as rosin, shellac, linseed oil, castor oil or soya oil;

nonreactive polymers, especially homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene-vinyl acetate copolymers (EVA) or atactic poly-α-olefins (APAO);

flame retardants, especially the aforementioned fillers aluminum hydroxide or magnesium hydroxide, boron compounds, antimony trioxide, phosphorous, or the flame-retardant plasticizers already stated; or additives, especially wetting agents, flow control agents, defoamers, deaerators, stabilizers against oxidation, heat, light or UV radiation, or biocides.

It may be useful to dry certain constituents chemically or physically before mixing them into the composition, particularly if they are to be stored together with the polymer containing silane groups.

In the case of a two-component composition, such further constituents may be part of the first component or of the second component. Free water is preferably not in the same component as the polymer containing silane groups. Further constituents that are reactive toward epoxide groups are preferably not in the same component as the epoxy resin.

In one preferred aspect of the invention, the composition additionally comprises at least one aromatic diluent having a boiling point of at least 180° C., especially at least 200° C. A diluent of this kind may improve the workability of the composition and allows good mechanical properties in the cured composition, especially a high tensile strength and tear resistance in conjunction with high stretchability.

Suitability as aromatic diluent having a boiling point of at least 180° C., especially at least 200° C., is possessed in particular by 2-phenoxyethanol, 2-benzyloxyethanol, benzyl alcohol, ethylene glycol diphenyl ether, propylene glycol phenyl ether, diphenylmethanol, diisopropylnaphthalene, petroleum fractions such for example as Solvesso® products (from Exxon), alkylphenols such as tert-butylphenol, nonylphenol, dodecylphenol or cardanol (from cashewnut-shell oil, containing as main constituent 3-(8,11,14-pentadecatrienyl)phenol), styrenized phenol, bisphenols, aromatic hydrocarbon resins, especially those containing phenol groups, alkoxylated phenol, especially ethoxylated or propoxylated phenol, phthalates or benzoates. Preferred among these are 2-phenoxyethanol, 2-benzyloxyethanol, benzyl alcohol, ethylene glycol diphenyl ether, propylene glycol phenyl ether, N-ethylpyrrolidone, diphenylmethanol, diisopropylnaphthalene, petroleum fractions such for example as Solvesso® products (from Exxon), cardanol, styrenized phenol, bisphenols, hydrocarbon resins containing phenol groups or ethoxylated or propoxylated phenol.

Particularly preferred as aromatic diluent is diisopropylnaphthalene and/or benzyl alcohol and/or cardanol, especially benzyl alcohol. Obtained as a result are liquid applied sealing membranes with outstanding workability, rapid curing, high tensile strength and tear resistance, high stretchability, and visually flawless film quality.

The amount of aromatic diluent having a boiling point of at least 180° C., especially at least 200° C., more particularly benzyl alcohol and/or cardanol, in the composition is in particular in the range from 1% to 30% by weight, preferably 2% to 20% by weight, more particularly 2% to 15% by weight.

In a further preferred aspect of the invention, the composition additionally comprises at least one reactive diluent which contains at least one epoxide group. A reactive diluent of this kind is preferably in the same component as the liquid epoxy resin.

Suitable reactive diluents are especially the glycidyl ethers of mono- or polyhydric phenols or aliphatic or cycloaliphatic alcohols, in particular 1,4-butanediol diglycidyl ether, 1,6-hexanediol diglycidyl ether, the glycidyl ethers of glycerol, polyglycerol or trimethylolpropane, phenyl glycidyl ether, cresyl glycidyl ether, guaiacol glycidyl ether, 4-methoxyphenyl glycidyl ether, p-n-butylphenyl glycidyl ether, p-tert-butylphenyl glycidyl ether, 4-nonylphenyl glycidyl ether, 4-dodecylphenyl glycidyl ether, cardanol glycidyl ether, benzyl glycidyl ether, allyl glycidyl ether, butyl glycidyl ether, hexyl glycidyl ether, 2-ethylhexyl glycidyl ether, or the glycidyl ethers of natural alcohols, such as, in particular, $C_8$- to $C_{10}$-alkyl glycidyl ethers, $C_{12}$- to $C_{14}$-alkyl glycidyl ethers or $C_{13}$- to $C_{15}$-alkyl glycidyl ethers.

The composition preferably comprises at least one alkyl glycidyl ether, more particularly a $C_8$- to $C_{10}$-, $C_{12}$- to $C_{14}$- or $C_{13}$- to $C_{15}$-alkyl glycidyl ether. By virtue of such a composition, sealing membranes having particularly high stretchability become possible.

In the composition, the ratio between the number of groups reactive toward epoxide groups to the number of epoxide groups is preferably in the range from 0.5 to 1.5, more preferably in the range from 0.8 to 1.2, especially in the range from 0.9 to 1.2.

The composition preferably contains only a low content of solvents. It contains preferably 200 g VOC per liter or less, especially 150 g VOC per liter or less, more preferably 100 g VOC per liter or less, very preferably 50 g VOC per liter or less. In particular it is largely free of solvents.

For use as a sealing membrane, the composition is produced and used preferably in the form of a two- or three component composition. In that case, the first, the second and, where appropriate, the third component of the composition are produced separately from one another, with the constituents of the respective component being mixed with one another, in the absence of moisture, to form a macroscopically homogeneous mixture. Each component is stored in a separate moisture-tight container. A suitable container is in particular a drum, a bulk container, a hobbock, a pail, a can, a pouch, a canister or a bottle. Each component per se is storage-stable, and can therefore be kept in the container in question for several months up to a year or longer, prior to its application, without any alteration in its properties to an extent relevant for its service.

At the time of this application, the components are mixed with one another shortly before or during the application procedure. The mixing ratio is selected preferably such that the groups reactive toward epoxide groups are present in a suitable ratio to the number of epoxide groups, as described above. In the case of a two-component composition, the mixing ratio between the first and second components in parts by weight is typically in the range from about 10:1 to 1.10.

The components are mixed by means of a suitable stirring mechanism, such as a double-shaft mixer, for example, with the individual components suitably having been premixed in the correct mixing ratio. Likewise possible is continuous machine processing by means of a multicomponent metering unit with static or dynamic mixing of the components. At the mixing stage, care should be taken to ensure that the components are mixed with maximum homogeneity. In the event of inadequate mixing, local deviations from the advantageous mixing ratio occur, which can result in a deterioration in the mechanical properties. If mixing precedes application, care must be taken to ensure that the time elapsing between mixing of the components and the application of the mixture is not too great, since if it is there may be disruptions, such as poor flow or retarded or incomplete development of the adhesion to the substrate, for example. Mixing takes place in particular at ambient temperature, which is typically in the range from about 5 to 50° C., preferably about 10 to 35° C.

Curing by chemical reaction begins with the mixing of the components. Here, the epoxide groups enter into a ring-opening reaction with primary and secondary amino groups to form amino alcohol units. Further epoxide groups react with themselves in anionic polymerization. The silane groups undergo hydrolysis with release of alcohol, forming silanol groups (Si—OH groups) and, through subsequent condensation reactions, siloxane groups (Si—O—Si groups). As a result of these and possibly further reactions, the composition cures to give a crosslinked polymer. If the water for hydrolysis of the silane groups was not already present in the composition or has been released therein, it may come from the air (atmospheric humidity) or from a substrate, or the composition may be contacted, by coating, spraying or mixed incorporation, for example, with a water-containing component.

Curing takes place typically at ambient temperature, and typically extends over a few days to weeks until it is largely at an end under the prevailing conditions. Curing proceeds preferably so as to ensure not only a sufficient potlife or open time but also rapid curing, allowing the composition to be applied in good order and to be tack-free as soon as possible after application, so that it can be made accessible and, where appropriate, can be worked on further.

A further subject of the invention is therefore a cured composition or sealing membrane obtained from the described use by mixing all of the ingredients and/or components of the composition, applying the mixed composition, and curing the mixed composition.

On application, the freshly mixed composition, still liquid, is applied within its open time, as a coating or a sealing membrane, to a level or slightly inclined surface, typically by pouring it onto a substrate and then spreading it two-dimensionally until the desired layer thickness is reached, by means of a roller, a slider, a notched trowel or a spatula, for example.

The "open time" or else "potlife" here is the time which elapses between the mixing of the components and the point in time at which it is no longer possible for composition to be properly applied. A typical measure of the end of the potlife is the attainment of a defined viscosity value.

The freshly mixed composition preferably has a viscosity at 20° C. in the range from 0.5 to 15 Pa·s, preferably 0.5 to 10 Pa·s, especially 0.5 to 5 Pa·s. The composition can therefore be worked well as a sealing membrane for liquid application. It is preferably self-leveling, meaning that it levels of its own accord to give an even surface after it has been worked by means of a roller, notched trowel, spiked roller or the like.

In one operation, typically a layer thickness in the range from 0.5 to 3 mm, especially 0.75 to 2.5 mm, is applied.

The composition can be applied to a variety of substrates, and on curing results in the sealing membrane in the form of an elastic coating that protects the substrate from water penetration.

The composition or sealing membrane can be applied in one or more layers. One or more finishing coats may be applied to the layer system. As a topmost or final layer, a seal may be applied.

This "seal" is a transparent or pigmented, high-grade coating which is applied as the uppermost, thin layer to a coating. It protects and enhances the surface of the coating, and closes pores that are still present. The layer thickness of a seal (in dry state) is typically in the range from 0.03 to 0.3 mm.

The seal offers additional protection from UV light, oxidation or microbial growth, affords opportunities for esthetic design, protects the coating from mechanical attacks, prevents soiling and/or makes cleaning easier.

The composition in the cured state at room temperature preferably has a tensile strength in the range from 2 to 15 MPa, preferably 3 to 12 MPa, especially 4 to 12 MPa.

The composition in the cured state at room temperature preferably has an elongation at break of at least 50%, preferably at least 70%, especially at least 80%, more preferably at least 100%, most preferably at least 200%.

The composition in the cured state at room temperature preferably has a modulus of elasticity in the range from 0.5 to 5% elongation of at most 15 MPa, preferably at most 10 MPa.

The composition in the cured state at room temperature preferably has a tear resistance of at least 3 MPa, preferably at least 4 MPa, especially at least 5 MPa.

The composition in the cured state at room temperature very preferably has a tensile strength of at least 2 MPa, an elongation at break of at least 100%, especially at least 200%, and a tear resistance of at least 3 MPa, preferably at least 4 MPa, especially at least 4.5 MPa.

Especially preferably the value for the tear resistance here is higher than, equal to or just a little lower than the value for the modulus of elasticity in the range from 0.5% to 5% elongation.

The tensile strength, the elongation at break, the modulus of elasticity or the tear resistance here are determined on a free film having a layer thickness of 2 mm, as described in the examples.

The mechanical properties of such material make it especially suitable as a sealing membrane.

The liquid-applied composition or sealing membrane may be employed for the sealing of roofs, especially flat roofs or gently inclined roof areas, roof terraces or roof gardens, or else of planting vessels, balconies, patios, squares or building foundations, or in the interior of buildings for water sealing, as for example beneath tiles or ceramic slabs in wet cells, kitchens, industrial halls or manufacturing spaces. It can also be used for purposes of repair, on leaking roof membranes, for example.

It is preferably employed on a roof, more particularly a flat roof or gently inclined roof. It can be used for sealing on a new roof or for the purposes of repair. The sealing membrane is also particularly suitable for detailed work, such as angled geometries, pipe penetrations or built-on constructions such as, for example, photovoltaic systems, photothermal systems or air conditioning systems, on a roof where sealing is to take place.

The composition or sealing membrane is used with preference in a roof sealing system comprising
optionally a primer and/or a base coat and/or a repair compound or leveling compound,
at least one layer of the composition described, in a layer thickness of 0.5 to 3 mm, optionally in combination with a mechanical reinforcement,
optionally a finishing coat and/or seal coat.

Suitable mechanical reinforcement comprises in particular a reinforcing fabric such as, more particularly, a plastic mesh or fibers or a fleece mat, more particularly a woven polyester fleece mat or a fleece mat made from non-woven polyester fibers or non-woven glass fibers.

Where a mechanical reinforcement is used in the form of a reinforcing fabric or a fleece mat, it is laid preferably onto the freshly applied first layer of the composition and is incorporated into the composition within the open time of the composition, by means of a roller or brush, for example. After the curing of the composition with the incorporated mechanical reinforcement, a further layer of the composition and/or a finishing coat and/or a seal may be applied thereto. Where fibers are used, they may be mixed into the liquid composition before it is applied or they may be scattered into the applied composition while it is still liquid.

Suitable substrates to which the composition or sealing membrane can be applied are, in particular
concrete, lightweight concrete, mortar, brick, shingle, roof tile, slate, gypsum, anhydrite or natural stone such as granite or marble;
repair or leveling compounds based on PCC (polymer-modified cement mortar) or ECC (epoxy resin-modified cement mortar);
metals and alloys such as aluminum, copper, iron, steel, nonferrous metals, including surface-finished metals and alloys such as galvanized or chromed metals;
asphalt or bitumen;
plastics such as PVC, ABS, PC, PA, polyester, PMMA, SAN, epoxy resins, phenolic resins, PUR, POM, PO, PE, PP, EPM or EPDM, each untreated or surface-treated by plasma, corona or flaming; especially PVC, PO (FPO, TPO) or EPDM films;
insulation foams, especially made of EPS, XPS, PUR, PIR, rockwool, glass wool or foamed glass;
coated substrates such as painted tiles, coated concrete or powder-coated metals.

As and when necessary, the substrates may be pretreated before the composition or sealing membrane is applied, examples of such pretreatment being by physical and/or chemical cleaning methods, as for example abrading, sandblasting, shotblasting, brushing, removal by suction or by blowing, jetting with high-pressure or ultra-high pressure water, and/or by treatment with cleaners or solvents, and/or by application of an adhesion promoter, adhesion promoter solution or primer.

Application and curing of the composition or sealing membrane affords an article sealed or coated with the composition described. The article more particularly is an edifice, more particularly an edifice in building construction or in civil engineering.

The described use features advantageous properties. The composition or sealing membrane for application in liquid form is largely odorless and is stable on storage in the form of a two-component or three-component composition. For application, the components can be mixed well with one another, with the mixed material having a low viscosity and an open time sufficient long to allow it to be applied manually as a self-leveling membrane or coating. The composition or sealing membrane cures rapidly and reliably under ambient conditions to form an elastic material with high strength, stretchability and tear resistance and with a modulus of elasticity that is not too high. In view of the fact that the composition or sealing membrane can be formulated without solvents and contains no trace of monomeric isocyanates, it has a low toxicity and hence requires no special protective measures for safe use.

EXAMPLES

Adduced hereinafter are working examples which are intended to elucidate the invention described in detail. It will be appreciated that the invention is not restricted to these described working examples.

"AHEW" stands for amine hydrogen equivalent weight.
"EEW" stands for epoxy equivalent weight.
"Standard climatic conditions" refer to a temperature of 23±1° C. and a relative air humidity of 50±5%. "SCC" stands for "standard climatic conditions".
Description of Measuring Methods:
Viscosity was determined on a thermostated Rheotec RC30 cone-plate viscometer (cone diameter 25 mm, cone angle 1°, cone tip-plate distance 0.05 mm, shear rate 10 rpm).
Amine value was determined by means of titration (with 0.1 N $HClO_4$ in acetic acid versus crystal violet).
Silane Group-Containing Polymers Used:
STP Polymer-1:
In the absence of moisture, 1000 g of Acclaim® 12200 polyol (from Covestro; low monol polyoxypropylenediol, OH number 11.0 mg KOH/g, water content around 0.02 wt %), 43.6 g of isophorone diisocyanate (Vestanat® IPDI from Evonik Industries), 126.4 g of diisodecyl phthalate and 0.12 g of dibutyltin dilaurate were heated to 90° C. with continuous stirring and left at this temperature until the free isocyanate group content as determined by titrimetry had reached a value of 0.63 wt %. Subsequently, 62.3 g of diethyl N-(3-trimethoxysilylpropyl)aminosuccinate were mixed in and the mixture was stirred at 90° C. until it was no longer possible to detect any free isocyanate by means of FT-IR spectroscopy. The silane-functional polymer was cooled to room temperature and stored in the absence of moisture. It was liquid at room temperature and had a viscosity at 20° C. of 99 Pa·s.

STP Polymer-1 contains 10% by weight of plasticizer (diisodecyl phthalate).
MS Polymer™ S303H:
Polymer containing silane groups, from the reaction of polyethers containing allyl groups with hydrosilanes (hydrosilylation), being free from urethane groups and/or urea groups (from Kaneka Corp.).
Further Substances Used:
Araldite® GY 250: bisphenol A diglycidyl ether, EEW 187.5 g/eq (from Huntsman)
Araldite® PY 302-2: bisphenol A/F diglycidyl ether, EEW 173.5 g/eq (from Huntsman)

Araldite® DY E: monoglycidyl ether of $C_{12}$ to $C_{14}$ alcohols, EEW around 290 g/eq (from Huntsman)

Jeffamine® D-400: polyetherdiamine with average molecular weight of 430 g/mol, AHEW 115 g/eq (from Huntsman)

Vestamin® TMD: 2,2(4),4-trimethylhexamethylenediamine, AHEW 39.6 g/eq (from Evonik)

N-Benzylpropane-1,2-diamine: prepared as described below, AHEW 54.8 g/eq

Gaskamine® 240: styrenized 1,3-bis(aminomethyl)benzene, AHEW 103 g/eq (from Mitsubishi Gas Chemical)

Dytek® A: 1,5-diamino-2-methylpentane, AHEW 29.0 g/eq (from Invista)

Vestamin® IPD: 3-aminomethyl-3,5,5-trimethylcyclohexylamine, AHEW 42.6 g/eq (from Evonik)

MXDA: 1,3-bis(aminomethyl)benzene, AHEW 34.0 g/eq (from Mitsubishi Gas Chemical)

1,3-BAC: 1,3-bis(aminomethyl)cyclohexane, AHEW 35.5 g/eq (from Mitsubishi Gas Chemical)

TEPA: tetraethylenepentamine (TEPA), AHEW around 30 g/eq (technical, from Huntsman)

CeTePox® 0214 H: reaction product of 2,2(4),4-trimethylhexamethylenediamine and acrylonitrile, AHEW 70 g/eq (from CTP)

Silquest® A-1120: N-(2-aminoethyl)-3-aminopropyltrimethoxysilane, AHEW 74.1 g/eq (from Momentive)

DBTDL 10%: dibutyltin(IV) dilaurate, 10% by weight in diisodecyl phthalate

Ancamine® K54: 2,4,6-tris(dimethylaminomethyl)phenol (from Air Products)

Cardanol: Cardolite® NX-2026 from Cardolite Corp.

Rütasolv DI: diisopropylnaphthalene, isomer mixture (from Rütgers)

N-benzylpropane-1,2-diamine

A round-bottom flask was initially charged with 444.8 g (6 mol) of propane-1,2-diamine under a nitrogen atmosphere at room temperature. With good stirring, a solution of 212.2 g (2 mol) of benzaldehyde in 1500 mL of isopropanol was slowly added dropwise, and the mixture was stirred for 2 hours. The reaction mixture was then hydrogenated in a continuous hydrogenation apparatus with a Pd/C fixed bed catalyst at a hydrogen pressure of 90 bar, a temperature of 85° C. and a flow rate of 5 mL/min. To monitor the reaction, IR spectroscopy was used to check whether the imine band at about 1665 cm$^{-1}$ had disappeared. Thereafter, the hydrogenated solution was concentrated on a rotary evaporator at 65° C., removing unreacted propane-1,2-diamine and isopropanol. A clear, pale yellowish liquid was obtained. 300 g of this were distilled at 80° C. under reduced pressure, with collection of 237.5 g of distillate at a vapor temperature of 60 to 63° C. and 0.08 to 0.09 bar. A colorless liquid having an amine value of 682 mg KOH/g was obtained, which, by $^1$H NMR, was a mixture of $N^1$-benzylpropane-1,2-diamine and $N^2$-benzylpropane-1,2-diamine in a ratio of about 2/1 and had a GC purity of >97%.

Production of Sealing Membranes:

For each sealing membrane, the ingredients specified in tables 1 to 4 were mixed in the specified amounts (in parts by weight) of component-1 by means of a centrifugal mixer (SpeedMixer™ DAC 150, FlackTek Inc.) and stored with exclusion of moisture.

Similarly, the ingredients of component-2 specified in tables 1 to 4 were processed and stored.

Subsequently, the two components of each composition were processed by means of the centrifugal mixer to give a homogeneous liquid and this was tested immediately as follows:

1 minute after mixing, the viscosity was determined at 20° C.

The potlife was determined by using a spatula to agitate 20 grams of the mixed composition at regular intervals. When the mixed composition was felt for the first time to have thickened to too great an extent for reasonable working, the potlife was read off.

To measure the time until the composition became free from tack, abbreviated to "TFT", a small portion of the mixed composition at room temperature was applied in a layer thickness of around 3 mm to cardboard and, under standard conditions, a determination was made of the time which elapsed until an LDPE pipette used to gently touch the surface of the composition for the first time no longer had any residues left on it.

To determine the mechanical properties, the liquid-applied membrane was poured onto a PTFE-coated film to give a film of thickness 2 mm and stored under standard climatic conditions for 14 days, and a few dumbbells having a length of 75 mm with a bar length of 30 mm and a bar width of 4 mm were punched out of the film and these were tested in accordance with DIN EN 53504 at a strain rate of 200 mm/minute for tensile strength (breaking force), elongation at break, and modulus of elasticity at 0.5 to 5.0% elongation (modulus of elasticity 5%). Furthermore, a number of test specimens were punched out for determination of the tear resistance and were tested in accordance with DIN ISO 34 at a strain rate of 500 mm/min.

Shore A hardness was determined according to DIN 53505 on test specimens cured under standard conditions for 14 days. The value in this case was determined in each case on the top, on the side of the test specimen facing the air. Additionally, the test specimen was turned over and a determination was likewise made on the bottom, on the side not exposed to the air. The two values are reported as "top/bottom" in tables 1 to 4. Here, values for top and bottom that are very similar are a sign of complete and undisrupted curing. After 14 days under SCC, the appearance of all the films was rated visually. After curing, all of the films were absolutely nontacky, free from bubbles, and white to pale yellowish, opaque to semitransparent (referred to as "opaque—transparent"), with a glossy to silk-matt surface. Certain films showed streaking on the surface, and this is reported in each case.

The results are reported in tables 1 to 4.

Examples Z-1 to Z-17 are inventive liquid-applied sealing membranes.

TABLE 1

| Composition and properties of examples Z-1 to Z-6. | | | | | | |
|---|---|---|---|---|---|---|
| Example | Z-1 | Z-2 | Z-3 | Z-4 | Z-5 | Z-6 |
| Component-1: | | | | | | |
| STP Polymer-1 | 47.5 | 45.0 | 45.0 | 45.0 | 48.0 | 48.0 |
| Araldite ® GY 250 | 38.0 | 38.0 | 38.0 | 38.0 | 38.0 | 38.0 |
| Vinyltrimethoxysilane | 2.5 | 5.0 | 5.0 | 5.0 | 5.0 | 5.0 |
| Dioctyl adipate | 7.0 | 7.0 | 7.0 | 7.0 | 7.0 | 7.0 |
| DBTDL 10% | 5.0 | 5.0 | 5.0 | 5.0 | 2.0 | 2.0 |

TABLE 1-continued

Composition and properties of examples Z-1 to Z-6.

| Example | Z-1 | Z-2 | Z-3 | Z-4 | Z-5 | Z-6 |
|---|---|---|---|---|---|---|
| Component-2: | | | | | | |
| Silquest ® A-1120 | 0.5 | 0.5 | 0.3 | 0.4 | 0.4 | 0.7 |
| Jeffamine ® D-400 | 19.9 | 19.9 | — | 10.6 | 10.4 | 10.4 |
| Vestamin ® TMD | 2.4 | 2.4 | — | — | — | — |
| N-Benzylpropane-1,2-diamine | — | — | 13.0 | 8.0 | 7.2 | 6.8 |
| Ancamine ® K54 | 1.2 | 1.2 | 0.7 | 1.0 | — | — |
| Viscosity [Pa · s] | 6.1 | 3.9 | 5.1 | 4.4 | 4.7 | 4.5 |
| TFT [min.] | 60 | 65 | 50 | 50 | 95 | 90 |
| Appearance | opaque - transp. | opaque - transp. | opaque - transp. | opaque - transp. | opaque - transp. | opaque - transp. |
| Tensile strength [MPa] | 5.3 | 5.0 | 4.2 | 6.3 | 5.8 | 5.3 |
| Elongation at break | 133% | 125% | 122% | 128% | 128% | 101% |
| Modulus of elasticity 5% [MPa] | 5.1 | 6.7 | 3.5 | 5.8 | 3.4 | 4.4 |
| Tear resist. [N/mm] | 5.1 | 6.0 | 4.4 | 5.4 | 3.7 | 4.0 |
| Shore A top/bottom | 68/68 | 67/59 | 65/63 | 69/63 | n.d. | 68/59 |

"Tear resist." stands for "tear resistance"; "transp." stands for "transparent"; "n.d." stands for "not determined".

TABLE 2

Composition and properties of examples Z-7 to Z-13.

| Example | Z-7 | Z-8 | Z-9 | Z-10 | Z-11 | Z-12 | Z-13 |
|---|---|---|---|---|---|---|---|
| Component-1: | | | | | | | |
| STP Polymer-1 | 53.0 | 53.0 | 53.0 | 53.0 | 53.0 | 53.0 | 53.0 |
| Araldite ® GY 250 | 38.0 | 38.0 | 38.0 | 38.0 | 38.0 | 38.0 | 38.0 |
| Dioctyl adipate | 7.0 | 7.0 | 7.0 | 7.0 | 7.0 | 7.0 | 7.0 |
| DBTDL 10% | 2.0 | 2.0 | 2.0 | 2.0 | 2.0 | 2.0 | 2.0 |
| Component-2: | | | | | | | |
| Silquest ® A-1120 | 0.6 | 0.5 | 0.5 | 0.5 | 0.5 | 0.4 | 0.5 |
| Jeffamine ® D-400 | 26.0 | 20.8 | 22.4 | 19.1 | 19.9 | 18.3 | 19.1 |
| N-Benzylpropane-1,2-diamine | — | 2.5 | — | — | — | — | — |
| Gaskamine ® 240 | — | — | 2.7 | — | — | — | — |
| Dytek ® A | — | — | — | 2.3 | — | — | — |
| Vestamin ® IPD | — | — | — | — | 2.4 | — | — |
| MXDA | — | — | — | — | — | 2.2 | — |
| 1,3-BAC | — | — | — | — | — | — | 2.3 |
| Ancamine ® K54 | 1.4 | 1.3 | 1.4 | 1.2 | 1.2 | 1.1 | 1.2 |
| Viscosity [Pa · s] | 8.8 | 9.8 | 11.2 | 9.9 | 10.7 | 11.5 | 11.3 |
| TFT [min.] | 70 | 60 | 70 | 70 | 65 | 65 | 55 |
| Appearance | opaque - transp. | opaque - transp. | opaque - transp. | opaque - transp., streaking | opaque - transp. | opaque - transp. | opaque - transp., streaking |
| Tensile strength [MPa] | 5.6 | 5.6 | 5.1 | 5.8 | 4.1 | 3.5 | 2.7 |
| Elongation at break | 123% | 118% | 108% | 138% | 97% | 102% | 86% |
| Modulus of elasticity 5% [MPa] | 11.4 | 8.8 | 9.6 | 4.3 | 9.5 | 3.4 | 5.4 |
| Tear resist. [N/mm] | 7.6 | 6.5 | 6.7 | 3.6 | 5.5 | 3.4 | 3.9 |
| Shore A top/bottom | 72/65 | 77/64 | 74/65 | 68/66 | 75/65 | 66/65 | 68/64 |

"Tear resist" stands for "tear resistance"; "transp." stands for "transparent"

TABLE 3

Composition and properties of examples Z-4, Z14 and Z-15.

| Example | Z-4 | Z-14 | Z-15 |
|---|---|---|---|
| Component-1: | | | |
| STP Polymer-1 | 45.0 | 45.0 | 45.0 |
| Araldite ® GY 250 | 38.0 | 38.0 | 38.0 |
| Vinyltrimethoxysilane | 5.0 | 5.0 | 5.0 |
| Dioctyl adipate | 7.0 | 7.0 | 7.0 |
| DBTDL 10% | 5.0 | 5.0 | 5.0 |
| Component-2: | | | |
| Silquest ® A-1120 | 0.4 | 0.4 | 0.4 |
| Jeffamine ® D-400 | 10.6 | 10.6 | 10.6 |
| N-Benzylpropane-1,2-diamine | 8.0 | 8.0 | 8.0 |
| Ancamine ® K54 | 1.0 | 1.0 | 1.0 |
| Benzyl alcohol | — | 5.0 | — |
| Cardanol | — | — | 5.0 |
| Viscosity [Pa · s] | 4.4 | 2.9 | 3.2 |
| TFT [min.] | 50 | 80 | 65 |
| Appearance | opaque-transparent | opaque-transparent | opaque-transparent |
| Tensile strength [MPa] | 6.3 | 5.6 | 7.0 |
| Elongation at break [%] | 128 | 114 | 138 |
| Modulus of elasticity 5% [MPa] | 5.8 | 5.0 | 5.7 |
| Tear resistance [N/mm] | 5.4 | 4.9 | 4.8 |
| Shore A top/bottom | 69/63 | 66/56 | 69/58 |

TABLE 4

Composition and properties of examples Z-16 and Z-17.

| Example | Z-16 | Z-17 |
|---|---|---|
| Component-1: | | |
| STP Polymer-1 | 44.0 | — |
| MS Polymer ™ S303H | — | 44.0 |
| Araldite ® GY 250 | 25.6 | 25.6 |
| Araldite ® PY 302-2 | 6.4 | 6.4 |
| Araldite ® DY-E | 2.0 | 2.0 |
| Rütasolv DI | 5.0 | 5.0 |
| Vinyltrimethoxysilane | 5.0 | 5.0 |
| Dioctyl adipate | 10.0 | 10.0 |
| DBTDL 10% | 2.0 | 2.0 |
| Component-2: | | |
| Vestamin ® IPD | 2.1 | 2.1 |
| MXDA | 2.0 | 2.0 |
| TEPA | 1.2 | 1.2 |
| CeTePox ® 0214 H | 0.7 | 0.7 |
| Ancamine ® K54 | 0.8 | 0.8 |
| Benzyl alcohol | 6.2 | 6.2 |
| Viscosity [Pa · s] | 3.0 | 1.5 |
| TFT [min.] | 75 | around 2 days |
| Appearance | opaque-transparent | inhomogeneous, uneven, nontransparent, sticky at the bottom |
| Tensile strength [MPa] | 3.0 | 0.9* |
| Elongation at break [%] | 352 | 210* |
| Modulus of elasticity 5% [MPa] | 0.9 | 0.7* |
| Tear resistance [N/mm] | 5.4 | 3.6* |
| Shore A top/bottom | 32/35 | n.d. |

*measured after 21 rather than 14 days under SCC
"n.d." stands for "not determined"

The invention claimed is:

1. A composition comprising:
   at least one polymer which is liquid at room temperature and contains silane groups,
   at least one liquid epoxy resin,
   at least one aliphatic polyamine having a molecular weight of at least 115 g/mol and containing at least three amine hydrogens that are reactive toward epoxide groups, wherein:
   the at least one aliphatic polyamine includes a combination of 1-amino-3-aminomethyl-3,5,5-trimethylcyclohexane and at least one amine selected from the group consisting of triethylenetetramine, tetraethylenepentamine, pentaethylenehexamine, and N,N'-bis(3-aminopropyl)ethylenediamine, and
   the composition is a liquid that is configured to form a sealing membrane after curing, and
   the composition in the cured state at room temperature has an elongation at break of at least 70%.

2. The composition as claimed in claim 1, wherein the polymer containing silane groups is a polyether containing silane groups.

3. The composition as claimed in claim 2, wherein the polyether containing silane groups further contains urethane groups and/or urea groups.

4. The composition as claimed in claim 1, wherein a weight ratio between the polymer containing silane groups and the liquid epoxy resin is in the range from 70/30 to 40/60.

5. The composition as claimed in claim 1, wherein the at least one aliphatic polyamine further includes a polyoxyalkylenediamine or -triamine having an average molecular weight in the range from 200 to 500 g/mol.

6. The composition as claimed in claim 1, wherein the at least one aliphatic polyamine further includes an amine represented by formula (I),

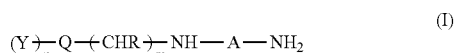

$$(Y)_n - Q - (CHR)_m - NH - A - NH_2 \tag{I}$$

where
   A is an alkylene radical having 2 to 15 carbon atoms which optionally contains one or more nitrogen atoms,
   R each independently is a hydrogen or methyl or phenyl radical,
   Q is a five-, six- or seven-membered cycloalkyl or aryl radical optionally having an oxygen, sulfur or nitrogen atom in the ring and having 4 to 7 carbon atoms, Y represents identical or different radicals selected from the group consisting of alkyl, alkoxy and dialkylamino having 1 to 18 carbon atoms, m is 1 or 2, and n is 0 or 1 or 2 or 3.

7. The composition as claimed in claim 1, further comprising at least one aromatic diluent having a boiling point of at least 180° C.

8. The composition as claimed in claim 1, further comprising at least one reactive diluent which contains at least one epoxide group.

9. The composition as claimed in claim 1, wherein the composition is a two-component composition consisting of a first component and a second component, which are produced, packed and stored separately from one another, the aliphatic polyamine not being present in the same component as the liquid epoxy resin.

10. The composition as claimed in claim 1, wherein the composition is a three-component composition consisting of a first component, a second component, and a third component, which are produced, packed and stored separately from one another, the liquid epoxy resin, the aliphatic polyamine and the polymer containing silane groups each being present in a separate component.

11. The composition as claimed in claim 1, further comprising at least one constituent selected from the group consisting of driers, accelerators, and plasticizers.

12. A sealing membrane for sealing a roof, the sealing membrane comprising the composition as claimed in claim 1.

13. A cured composition obtained from the composition as claimed in claim 1 by mixing all of the ingredients and/or components of the composition, applying the mixed composition, and curing the applied composition.

14. A roof sealing system comprising:
optionally a primer and/or a base coat and/or a repair or leveling compound,
at least one layer of the composition as claimed in claim 1 in a layer thickness of 0.5 to 3 mm, optionally in combination with a mechanical reinforcement, and
optionally a topcoat and/or seal coat.

15. The composition as claimed in claim 7, wherein the aromatic diluent is at least one selected from the group consisting of 2-phenoxyethanol, 2-benzyloxyethanol, benzyl alcohol, and diphenylmethanol.

16. The composition as claimed in claim 15, wherein the aromatic diluent is benzyl alcohol.

17. The composition as claimed in claim 1, wherein the composition in the cured state at room temperature has an elongation at break of at least 80%.

18. The composition as claimed in claim 1, wherein the weight ratio between 1-amino-3-aminomethyl-3,5,5-trimethylcyclohexane and the at least one amine selected from the group consisting of triethylenetetramine, tetraethylenepentamine, pentaethylenehexamine and N,N'-bis(3-aminopropyl)ethylenediamine is in a range of from 10/90 to 90/10.

19. The composition as claimed in claim 1, wherein the composition in the cured state at room temperature has an elongation at break of at least 150%.

20. The composition as claimed in claim 1, wherein the at least one aliphatic polyamine includes the combination of 1-amino-3-aminomethyl-3,5,5-trimethylcyclohexane and at least one of triethylenetetramine and tetraethylenepentamine.

* * * * *